United States Patent
Lee et al.

(10) Patent No.: US 7,280,543 B2
(45) Date of Patent: Oct. 9, 2007

(54) EXTENSIBLE OAM SUPPORT IN MPLS/ATM NETWORKS

(75) Inventors: Cheng-Yin Lee, Ottawa (CA); Amr Elkady, Ottawa (CA)

(73) Assignee: Alcatel Canada Inc., Kanata, ON (CA)

( * ) Notice: Subject to any disclaimer, the term of this patent is extended or adjusted under 35 U.S.C. 154(b) by 1116 days.

(21) Appl. No.: 10/226,050

(22) Filed: Aug. 23, 2002

(65) Prior Publication Data
US 2004/0037226 A1    Feb. 26, 2004

(51) Int. Cl.
  *H04L 12/28*  (2006.01)
  *H04L 12/56*  (2006.01)

(52) U.S. Cl. ............... 370/395.5; 370/395.52; 370/410; 370/467; 370/241.1

(58) Field of Classification Search ........ 370/254, 370/395.5, 395.52, 401, 410, 464, 465, 466, 370/467, 241, 241.1
See application file for complete search history.

(56) References Cited

U.S. PATENT DOCUMENTS 6,999,479 B1 *  2/2006  Jha ...................... 370/535

2005/0201299 A1 *  9/2005  Radi et al. .............. 370/254
2006/0092946 A1 *  5/2006  Ah Sue .................. 370/395.3

FOREIGN PATENT DOCUMENTS

EP    1 215 857 A2    6/2002
EP    1 322 080 A2    6/2003

OTHER PUBLICATIONS

Thomas C. Chen, et al., "Reliable services in MPLS", vol. 37, No. 12, 1999.

* cited by examiner

*Primary Examiner*—Ajit Patel
(74) *Attorney, Agent, or Firm*—Marks & Clerk; S. Mark Budd

(57) ABSTRACT

A method of processing OAM messages by network elements in a communications network is described. Elements in the network are provided with configuration information respecting OAM messages together with connection signaling upon setting up a call through the network. Each network element interprets the OAM messages and derives therefrom configuration information for use in executing an OAM function.

9 Claims, 3 Drawing Sheets

| OAM Function Number | Field1 Type | Length1 | Field2 Type | Length2 | ... | Fieldn Type | Lengthn |

OAM Cell/Packet format syntax specification in signaling or configuration message

| Cell/packet Header (including VCI/label) | OAM Function Number | Field1 Value | Field2 Value | Field3 Value | .... | Fieldn Value |

OAM Cell/Packet in the data path

EXTENSIBLE OAM SUPPORT IN MPLS/ATM NETWORKS

FIELD OF THE INVENTION

This invention relates to next generation network and service management applications and more particularly to the processing of OAM messages by network elements in communications networks.

BACKGROUND OF THE INVENTION

The influence of the Internet and a highly dynamic telecommunications market has raised demands for increased flexibility in communication systems while controlling costs. These influences necessitate a significant rethinking of the next generation network architecture. The main themes for the new networking mindset are convergence, consolidation, migration and simplification.

The service layer of the next generation network will in all likelihood, consist of a multi service capable IP network. The ubiquity, simplicity and openness of IP make it a natural catalyst for new applications, services, traffic and, consequently, new revenues. Developments in industry standards for IP quality of service and multi protocol label switching (MPLS) based traffic engineering provide the required technical capabilities to enable a multi service IP network.

Increasingly, IP-MPLS technology development is validating the qualities of ATM by emulating many of its features and functions to such an extent that a convergence of IP-MPLS and ATM in the core is a reality. One of the earliest examples of this convergence is the introduction of ATM mediation over an IP-MPLS core where ATM traffic can be transparently tunneled through an IP-MPLS backbone using LSPs. Such a converged network core accommodates all types of traffic new and old and is well positioned to provide significant cost saving options for network operators looking to consolidate core networks.

Many traditional services, such as leased line, frame relay or cell relay are transported today over ATM networks. ATM is also the underlying technology for new digital subscriber line (DSL) and wireless local multi point distribution systems (LMDS) access applications. Just as ATM has been used to mediate a multi service traffic flow for a wide area network, there is now an opportunity to use MPLS to mediate ATM traffic across an IP-MPLS core. Mediating ATM traffic in this way enables ATM to continue to be employed at the edge of the network to adapt transport and aggregate multi service traffic.

ATM/MPLS mediating defines two encapsulation modes: cell encapsulation and packet encapsulation. Cell encapsulation allows full transparency by carrying all connection types (VCC and VPC), all AAL types and all cell types (user, OAM, RM). The packet encapsulation mode is intended mainly for AAL5 VCCs.

Today, OAM packets/cells are interpreted based on a predefined configuration comprising a fixed set of bits. The OAM packet/cell configuration is defined by standard bodies and the position and meaning of the bits cannot be changed without the necessary processes to introduce a new standard. In addition to the bit configuration the current standard specifies a number of bits that are reserved for future use. Thus, the current OAM packets/cell is statically defined in terms of location and meaning.

SUMMARY OF THE INVENTION

The present invention relates to a method of processing an operation, administration and maintenance (OAM) packet/cell whereby network elements can derive new functionality from configuration information embedded in the OAM message. This allows for an infinitely extendable format for OAM packet/cells and eliminates the need for standardizing the OAM fields in terms of bit numbers, length and position of fields.

Therefore, in accordance with the present invention there is provided a method of processing OAM messages by network elements in a communications network, the method comprising the steps of: signaling setup of a call through the network; providing network elements traversed by the call with configuration information for the OAM messages; and interpreting, at each network element, an OAM message received in accordance with the configuration information to execute an OAM function identified in the OAM message.

In accordance with a second aspect of the invention there is provided a system for processing OAM messages by network elements in a communications network, the system comprising: means to signal setup of a call through the network whereby network elements traversed by the call are provided with configuration information for the OAM messages; and means at each network element to interpret the OAM message received in accordance with the configuration information and to execute an OAM function identified in the OAM message.

BRIEF DESCRIPTION OF THE DRAWINGS

The invention will now be described in greater detail with reference to the attached drawings wherein.

DETAILED DESCRIPTION OF THE INVENTION

According to the present invention network elements in a communications network are instructed as to how to process previously unknown OAM functions by providing new OAM cell/packet format syntax specification during signaling of the connection/path. Thus, at the call set up stage the signaling process through the network elements is used to transport OAM cell/packets in which previously unidentifiable OAM functionality is included. Once the network elements are informed of the new OAM cell/packet and are provided with information respecting the fields of the OAM cell packet the network elements are able to process the new OAM cell/packet since they have already been informed of the packet format syntax and the corresponding OAM functionality. The implication of this is that the OAM cell/packet format syntax need not be standardized and the OAM functions may be customized by the network operators.

Therefore according to the present invention network elements are instructed as to how to process the OAM cell/packet during signaling of the connection path. The new type OAM cell packet according to the present invention is a cell/packet having a reserved VC1/label value to indicate that it is the special type of OAM cell/packet. Using this technique each network element on the signaling path is informed of the syntax of the specific OAM cell/packet function i.e. the field type and length of each field in the specific OAM cell/packet function.

Additionally, the syntax may include information, such as the field type of the corresponding OAM cell/packet function, in an encoded format. The use of the encoding feature provides greater flexibility for the messaging process. Since the number of field types that will likely be defined in, for example, a standard will be very large in comparison with the number of field types that will be actually used within a given connection, encoding provides an opportunity to make better use of the syntax. According to this scheme the field types which are being used are encoded using selected abbreviated numbers so that in this way their values are much smaller than their values might be in the standards. As an example: AIS might have a standards value of 0×123456, but during signaling it can be encoded according to the invention as 0×2. Thus, if the total of all the field types that are being used is say 16 then only 4 bits will be needed to represent field types in the connection. Otherwise, if this encoding was not used AIS, having the value 0×123456, would use about 15 bits to represent the field type. In this way, by modifying the standard field reference values, almost infinite space for adding more fields is provided.

Figures 1, 2, 3:
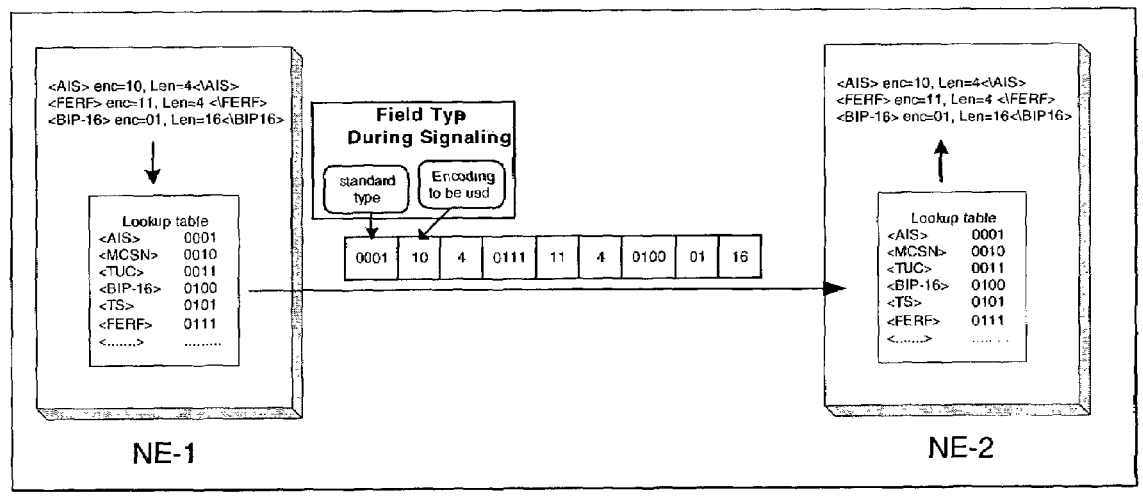
FIG. 1 illustrates an OAM cell/packet format syntax specification in signaling or configuration message.
FIG. 2 is an illustration of an OAM cell/packet in the data path.
FIG. 3 illustrates the exchange of information between network elements.

As shown in FIG. 1 an OAM cell/packet format with syntax specification in the signaling or configuration message includes certain relevant information such as the OAM function, the field type and length for each of the fields in the message. The OAM cell packet in the data path is shown in FIG. 2 wherein the header also includes a VCI label to indicate that it is a special OAM cell/packet. The OAM cell/packet for the data path has the field value inserted instead of the field length.

FIG. 3 illustrates the exchange of information between network elements wherein OAM functionality is conveyed. As shown in the message between entities the function number, type and length are shown in successive boxes. In the example shown the AIS message is encoded as number 10 with a length 4. A FERF message identified in the table as 0111 has encoding of 11 and a length of 4. Finally a bit-16 message which is identified in the lookup table as 0100 has an encoded number 01 and length 16. As indicated previously encoding maybe used to simplify the syntax.

Thus, using this specialized syntax unique OAM messaging can be conveyed between network elements and the messages are interpreted at each element to determine the functionality thereof. As discussed previously the syntax is passed between elements during the connection set up and signaling instance.

Figure 4:
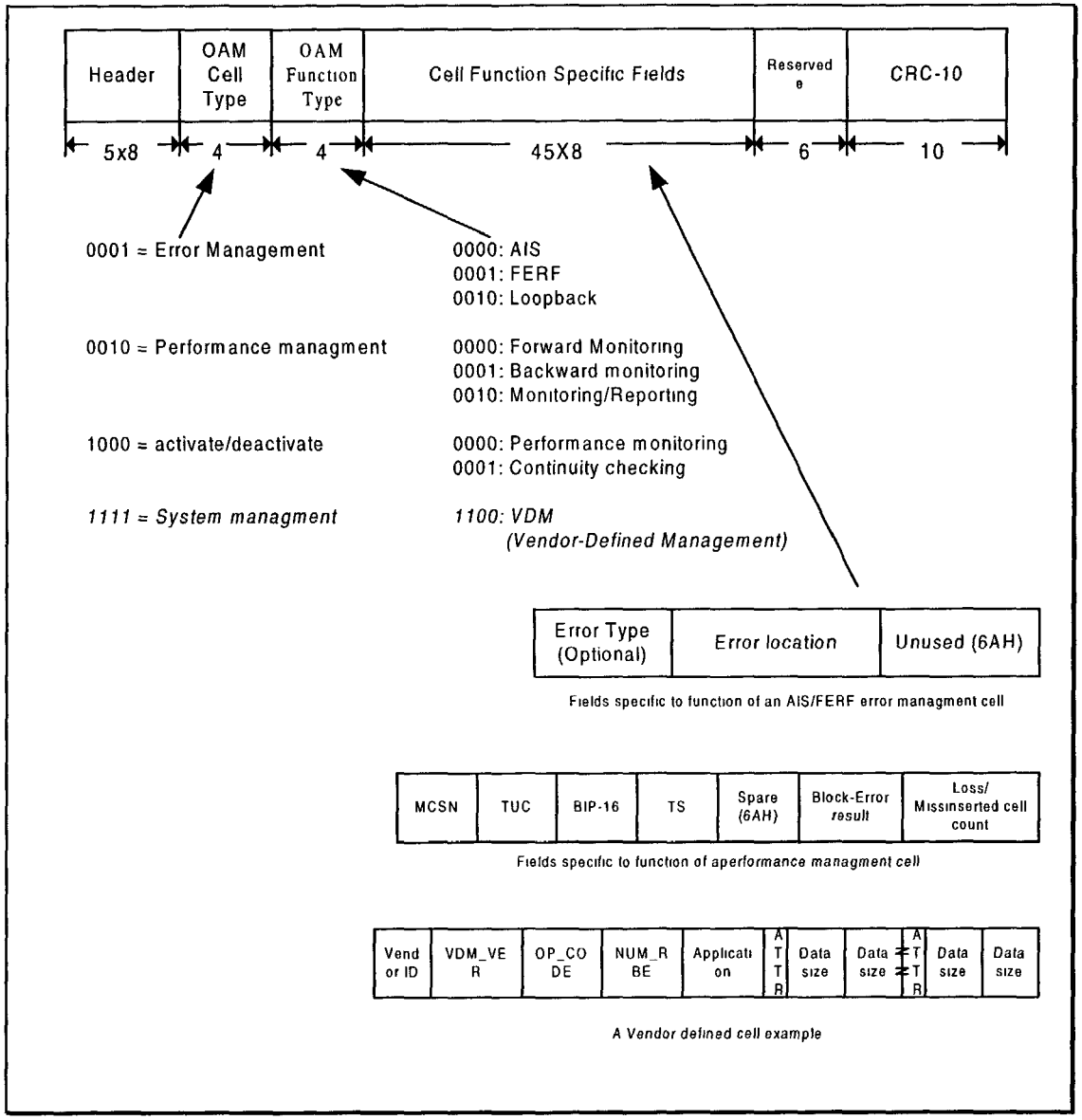
FIG. 4 illustrates a common OAM cell showing the typical fields.
Figure 5:
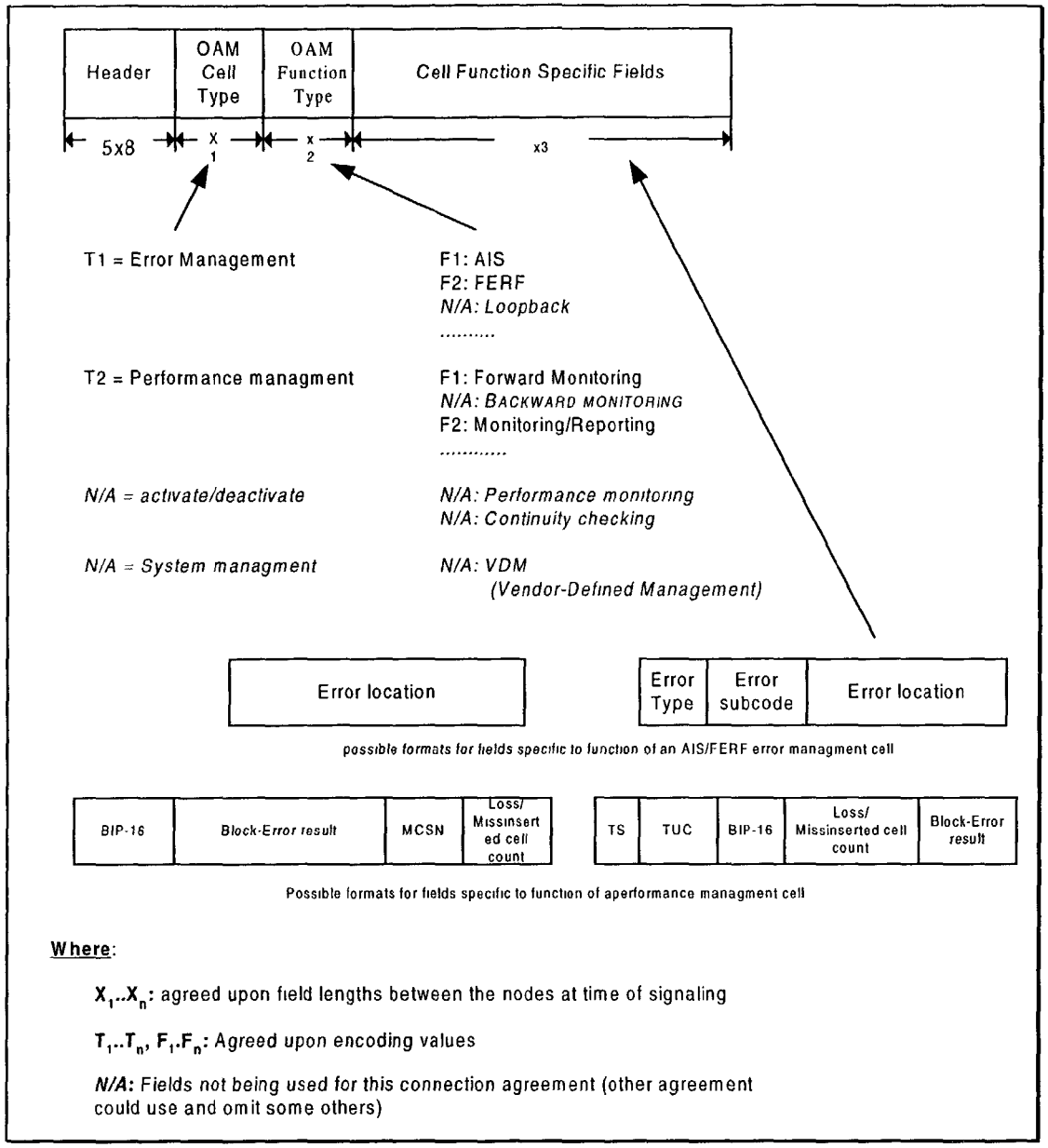
FIG. 5 shows the OAM fields using the present invention.

A comparison between a standard OAM packet format and the cell/packet OAM format according to the present invention are illustrated in FIGS. 4 and 5. From a comparison of these figures it will apparent that the OAM fields using the present invention eliminates the reserved section of the packet and this reserved portion is used with the other bits in the packet to carry functionality information between elements. From an implementation aspect only the syntax information of the OAM message has a pre-determined meaning which is passed to the network elements at the time of signalling. Information respecting OAM cell types, function types and fields is flexible.

Although specific embodiments of the invention have been described and illustrated it will be apparent to one skilled in the art that numerous changes can be made without departing from the basic concept. It is to be understood, however, that such changes will fall within the full scope of the invention as defined by the appended claims.

We claim:

1. A method of processing OAM messages by network elements in a communications network, the method comprising the steps of:

signaling setup of a call through the network;

providing network elements traversed by the call with configuration information for the OAM messages; and interpreting, at each network element, an OAM message received in accordance with the configuration information to execute an OAM function identified in the OAM message.

2. The method as defined in claim 1 wherein the configuration information includes syntax of the OAM message and an identifier of the corresponding OAM function.

3. The method as defined in claim 2 wherein the syntax includes type and length information for each field in the OAM message.

4. The method as defined in claim 3 wherein the OAM functions are predetermined.

5. The method as defined in claim 2 wherein encoding is used to compress the syntax.

6. The method as defined in claim 5 wherein the field type is encoded.

7. A system for processing OAM messages by network elements in a communications network, the system comprising:

means to signal setup of a call through the network whereby network elements traversed by the call are provided with syntax information for the OAM messages; and means at each network element to interpret the OAM message received in accordance with the syntax information and to execute an OAM function identified in the OAM message.

8. A method of processing OAM messages at a network element in a communications network, comprising the steps of:

receiving configuration information for the OAM messages as part of signaling setup of a call; and interpreting a received OAM message in accordance with the configuration information so as to execute an OAM function identified in the OAM message.

9. A network element in a communications network, comprising:

means to receive signal setup of a call, the signal setup providing syntax information for OAM messages; and means to interpret a received OAM message in accordance with the syntax information and to execute the OAM function identified in the OAM message.

\* \* \* \* \*